United States Patent
Storck

(10) Patent No.: US 7,012,924 B1
(45) Date of Patent: Mar. 14, 2006

(54) PROCESS AND UNIT FOR CONFIGURING OR MONITORING ATM DEVICES COMPRISING REGISTERS

(75) Inventor: Hubertus Storck, Düsseldorf (DE)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/889,522

(22) PCT Filed: Jan. 11, 2000

(86) PCT No.: PCT/EP00/00116

§ 371 (c)(1),
(2), (4) Date: Jul. 24, 2001

(87) PCT Pub. No.: WO00/44193

PCT Pub. Date: Jul. 27, 2000

(30) Foreign Application Priority Data

Jan. 22, 1999  (DE) ................ 199 02 436

(51) Int. Cl.
*H04L 12/28* (2006.01)

(52) U.S. Cl. .............. 370/395.7; 370/474; 370/476

(58) Field of Classification Search .......... 370/395.1, 370/395.7–395.72, 384, 410, 474, 476, 235, 370/236.1, 236.2, 412

See application file for complete search history.

(56) References Cited

U.S. PATENT DOCUMENTS 5,490,140 A  2/1996  Abensour et al.

(Continued)

FOREIGN PATENT DOCUMENTS

| EP | 0 801 513 A1 | 10/1997 |
| EP | 0 880 298 A2 | 11/1998 |

OTHER PUBLICATIONS

G. Siegmund, "ATM-the technology" 3rd edition Hüthig Publications, Verlag Heidelberg, pp. 91-92.

(Continued)

*Primary Examiner*—Ricky Q. Ngo
*Assistant Examiner*—Nittaya Juntima
(74) *Attorney, Agent, or Firm*—Cohen, Pontani, Lieberman & Pavane

(57) ABSTRACT

A control unit, ATM cell and process for writing data into registers of at least one device comprising a management interface or for reading values from registers of such devices, wherein communication between at least one management unit which generates the data to be written or which undertakes further processing of read-out data and the control units via an ATM inband protocol occurs so as to provide an option to inexpensively read or write data. The control units, which have access to the registers of at least one of the devices by way of the management unit, with instructions and information for specific devices connected to the respective control unit, are integrated into the payload of the ATM cells. The control units implement the instructions and, if applicable, transmit a response ATM cell back to the management unit.

51 Claims, 4 Drawing Sheets

U.S. PATENT DOCUMENTS

Figure 1:
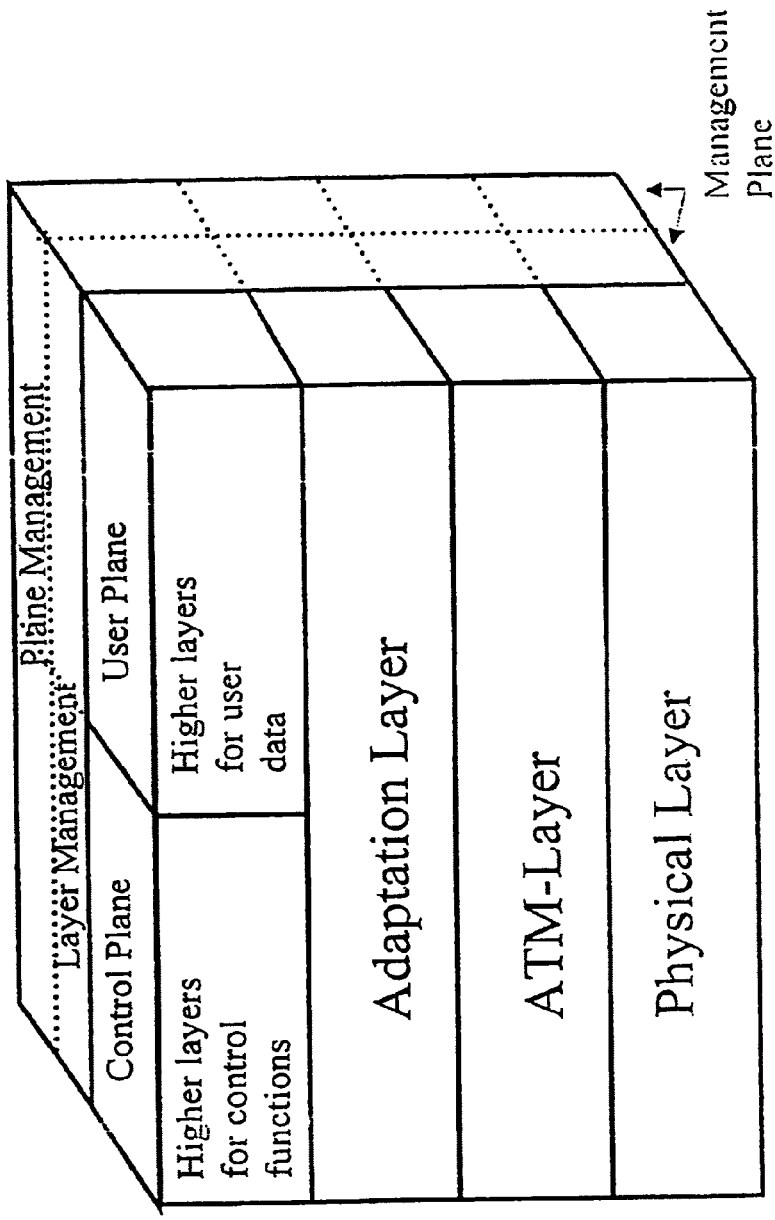

| | | | |
|---|---|---|---|
| 5,754,941 A | | 5/1998 | Sharpe et al. |
| 5,812,550 A | | 9/1998 | Sohn et al. ................. 370/395 |
| 6,021,124 A | * | 2/2000 | Haartsen ..................... 370/336 |
| 6,038,215 A | * | 3/2000 | Uekumasu .................. 370/230 |
| 6,272,144 B1 | * | 8/2001 | Berenbaum et al. ........ 370/419 |
| 6,661,796 B1 | * | 12/2003 | Takashima et al. ...... 370/395.1 |

OTHER PUBLICATIONS

The ATM Forum, Technical Committee: Utopia Level 2, Version 1.0 a f-phy-0039.000, Jun. 1995).

ITU-T I.610, "Common OAM cell Fields" p. 27, Nov. 1995.

ATM Forum: "An In-Band Configuration Protocal" TCAG, PHY, NM Working Groups, ATM Forum/97-1061 Dec. 1997, p. 1-6.

ITU-T I.361, "B-ISDN ATM Layer Specification", Integrated Services Digital Network, Overall Network Aspects and Functions, p. 1-30, Nov. 1995.

* cited by examiner

| - Byte - | -Byte- | -Byte- | -Byte- | - Byte- |

| ATM cell header | HEC |
|---|---|
| Instruction word 1 | |
| Instruction word 2 | |
| Instruction word 3 | |
| Instruction word 4 | |
| Instruction word 5 | |
| Instruction word 6 | |
| Instruction word 7 | |
| Instruction word 8 | |
| Instruction word 9 | |
| Instruction word 10 | |
| Instruction word 11 | |
| Supplementary word | |

FIG. 3

:──Byte n──:──Byte n+1──:──Byte n+2──:──Byte n+3──:

| OP | R | DS | Addresses | Data |
|---|---|---|---|---|

Operation code (2-bit)
Reserve (2-bit)
Identification of interface units

FIG. 4a

| | | Reserve | Int7 | Int6 | Int5 | Int4 | Int3 | Int2 | Int1 | Int0 | 000000 | CRC-10 |
|---|---|---|---|---|---|---|---|---|---|---|---|---|

Cell type identification
Sequential bit

FIG. 4b

PROCESS AND UNIT FOR CONFIGURING OR MONITORING ATM DEVICES COMPRISING REGISTERS

PRIORITY CLAIM

This is a national stage of PCT application No. PCT/EP00/00116, filed on Jan. 11, 2000. Priority is claimed on patent application No. 199 02 436.7 filed in Germany on Jan. 22, 1999.

FIELD OF THE INVENTION

The invention relates to a process for configuring or reading-out data from devices comprising registers. The invention also relates to a control unit and its integration into a management system for an ATM network for configuring and/or monitoring such devices, as well as an ATM cell.

BACKGROUND OF THE INVENTION

With an ATM network, data streams of various telecommunication services requiring different bit rates can be transmitted. According to the ATM concept, ATM cells of equal length are formed from various data streams with a digital transmission path which is the same at least across some sections. The structure of the ATM cells is standardised. The cells comprise a cell header of 5 bytes with control information and a payload space of 48 bytes. The control information among other things comprises details concerning the path which the respective cell has to take. Certain ATM service types have been introduced so as to fulfil the requirements of all telecommunication services in ATM networks. The ATM reference model represents the basis for describing these service types.

The ATM reference model is based on the principles of the OSI reference model; it is composed of a user plane, a control plane and a management plane (Gerd Siegmund: "ATM—The technology" 3rd edition Hüthig Publications, Verlag Heidelberg, pp. 91–92. [The aforementioned publication is in the German language, its original title being "ATM—Die Technik".] FIG. 1 shows this reference model where the user plane is further divided into the layers "physical layer", "ATM layer", "adaptation layer" and "higher layers for user data", with these layers having to be able to communicate with each other by way of suitable interfaces.

Interface units PHY which permit data transfer tailored to the respective transmission medium, form part of the physical layer.

Utopia Level 2 (The ATM Forum, Technical Committee: Utopia Level 2, Version 1.0 af-phy-0039.000, June 1995) provides a specification of the data path interface between the ATM layer and the interface unit PHY of the physical layer.

An ATM network can contain various devices which, as is the case with the interface units PHY of the physical layer, comprise registers and require a configuration and/or continuous monitoring of register values. For this reason, such devices must provide access for a management device via which configuration and/or monitoring is made possible.

Thus according to the UTOPIA level 2 specification, each of the interface units PHYs comprises a management interface (shown in Appendix 2) which is used by a management unit for configuring, administering and monitoring one or several PHYs. This management interface is in particular configured as a microprocessor interface.

Appendix 2 of Utopia Level 2 proposes a concrete design of management interfaces for interface units PHYs as a guideline for users. Usually this design is used. For example, in the case of a parallel interface, information is provided concerning required and optional interface signals as well as operations and read cycles.

If a management unit is to have access to several devices via its management interface, then connections between the management unit and all these devices must be established by using a bus. For example, an ATM network can comprise hundreds of interface units PHY, leading to considerable costs for these additional management networks.

SUMMARY OF THE INVENTION

It is thus the object of the invention to provide an option, for devices associated with an ATM network and comprising registers, for particularly inexpensive reading or writing of data into these registers or from these registers.

According to the invention, this object is met by a process for writing data into registers of at least one device comprising a management interface, involving the following steps:

composing ATM cells by at least one management unit, with the management unit addressing the ATM cells in each instance to a control unit linked to a data path interface, and integration of instructions associated with particular devices, e.g. writing of data into the registers of the devices, in the form of an operation code, together with the respective information into the payload of the ATM cells;

transmitting the ATM cells to the addressed control unit via the respective data path interface;

extracting the operation codes being associated with particular devices, and the associated information in the control unit contained in the payload of the ATM cell; and if after the operation code, data is to be entered, setting of the register values of the devices according to the information provided from the ATM cell for this.

This object is also met by a process for reading values from registers of a device comprising a management interface, involving the following steps:

composing ATM cells by at least one management unit, with the management unit addressing the ATM cells in each instance to a control unit linked to a data path interface, and integrating instructions associated with particular devices, e.g. reading of data from the registers of the devices, in the form of an operation code, together with the respective information into the payload of the ATM cells;

transmitting the ATM cells to the addressed control unit via the respective data path interface;

extracting the operation codes being associated with particular devices, and the associated information in the control unit contained in the payload of the ATM cell; and if after the operation code, register values are to be read out from devices, reading of the register values of the respective devices, integration of the read values into ATM cells with addressing to the management unit and transmission of the cells to the management unit.

Likewise, the object is met by a control unit which provides access to the management interface of at least one device comprising registers, as well as to an Utopia bus providing a data path interface of an ATM network, with the control unit being suitable for receiving ATM cells composed by a management unit and destined for the control unit, and extracting and carrying out individual instructions associated with a particular device, in particular reading and/or writing of register data into the devices or from the devices from the payload of these cells, and extracting them and carrying them out in respect of the respective device.

Finally, according to the invention, the object is also met by an ATM cell comprising a cell header of 5 bytes and a payload space of 48 bytes, said cell being used for transmitting management data between a management unit with access to an ATM network and at least one device, with said device comprising registers into which data is to be written and/or from which data is to be read out, and a management interface by way of which a control unit has access to the registers of the device, with the control unit furthermore having access to an Utopia bus providing a data path interface of an ATM network, and being suitable for receiving certain ATM cells composed by a management unit via the data path interface, said data being destined for the control unit, and from the payload of these cells to extract individual instructions associated with a particular device, in particular reading and/or writing of register data into the devices or from the devices, and to extract associated information and carry it out in respect of the particular device, with the payload space of the ATM cell comprising instruction blocks in which respective bits are provided for an operation code which identifies an instruction type such as read, write, no operation;
    for identification of a device to which the instruction in the instruction block is directed;
    which are associated with particular registers integrated in the identified device; and
    for data required for carrying out the instruction;
    and a supplementary block (trailer), in which bits are provided
    for identifying the cell type, such as a new cell or a retransmitted cell;
    as a sequential bit which is toggled with each composition of a new cell which does not constitute a repetition;
    for interrupt information; as well as
    for a checksum.

The process according to the invention, the control unit according to the invention and the ATM cell according to the invention provide the advantage in that they allow transmission of management information on the same paths as ATM data over the ATM network. Thus there is no need for a communications network dedicated to the transfer of management information. This represents a considerable load alleviation for the system design. Thus an ATM inband protocol is used to transmit management information which is required for configuring and/or monitoring units comprising registers, with management interface.

For the processes according to the invention, for which in particular a combined use is provided, for configuring a device, in particular an interface device PHY, as well as for monitoring status conditions and error conditions, which are provided by the device, the management unit reads or writes the register in the device by using the inband protocol.

The ATM cell according to the invention, the processes according to the invention and the control unit according to the invention can be used for configuring, controlling or monitoring not only PHYs but any devices comprising a management interface, in particular a microprocessor interface. For example, memories, micro processors, ATM layer devices or register modules may be considered.

A VPI/VCI address of its own may be allocated to each control unit so that the management unit can address the ATM cells to the control units, as is provided by the processes according to the invention. In cases where the management unit communicates directly with the control unit via an Utopia bus, there is an alternative option of addressing the control unit via a reserved Utopia bus address of the data interface to which the control unit is connected. Analogously, addressing of the management unit takes place via the control unit for a reply via the ATM address (VPI/VCI) of the management unit or via a reserved UTOPIA address.

In a preferred embodiment of the process the so-called "request-response" protocol is used with the basic operations read out/set. To this effect, each communication is initiated by the management unit by sending instructions to the control unit within the framework of an ATM cell. All cells are confirmed by a reply cell from the control unit to the management unit. In this, the reply cell represents a modified version of the original cell. For addressing with a UTOPIA address, the 5-byte cell header of the received ATM-cell is taken over for the answer cell; otherwise the respective VPI/VCI value of the management unit is set. Furthermore, the original payload of 48 bytes is copied. If the original ATM cell contained a read instruction, then the data read in according to the instructions are inserted into the areas of the response cell provided for this. Before the response cell is sent off, the CRC checksum is calculated anew and appended.

Advantageously, at least part of the contents updated in this way of the ATM cell to be transmitted back to the management unit, is stored in an intermediate memory in case it will be required later. In particular there is a provision for the contents of the entire ATM cell to be stored in the intermediate memory.

To ensure that only the instructions of properly transmitted ATM cells are being carried out, preferably the management unit must not send the next ATM cell to a particular control unit before it has received a response cell from it, or alternatively, before a defined time limit has been exceeded. The defined time limit depends on the minimum time required for transmitting the cell, processing it in the control unit and transmitting back a response cell. During processing of a cell, the control unit ignores any further incoming cell.

If the specified time has been exceeded, the management unit transmits the ATM cell again. The cell should contain information from which the control unit can detect whether the cell received by the management unit is a cell that has been transmitted for the first time or a cell that has been transmitted repeatedly. Taking into account the last processed cell, the control unit analyses whether the instructions of the cell have already been processed and thus only the last response cell, separately stored in the intermediate memory, needs to be sent to the management unit anew, or whether first of all the instructions contained in the cell need to be carried out. Analyses as to whether or not the instructions of the first cell have already been processed are necessary because reading out register values representing counter readings usually results in the respective counters being reset. Thus these counter readings would no longer be available during renewed readout of the register and are only maintained via an intermediate memory in the control unit.

Preferably the control unit according to the invention is not only able to extract instructions and data from ATM cells received and to ensure that the instructions are carried out, but equally to compose an ATM cell with addressing to a management unit, using register data from devices to which the control unit has access, and to transmit it to the management unit.

Still further-reaching functions of the control unit are imaginable for the future. For example the control unit can autonomously and regularly carry out separately stored instructions based on the same instruction set used by the management unit, and it can independently initiate communication with the management unit by transmitting an ATM cell to said management unit. For example the reserved bits in the supplementary block or a value not otherwise used, of the operation code, can be used to make it possible for such a cell to be identified in the management unit. In this way, effective automatic periodic monitoring data acquisition can be achieved by which the load in the ATM network can also be reduced because there is no need to send recurring information to the devices comprising registers.

The control unit according to the invention should in particular be seen as a component of a management system for an ATM network for configuring and/or monitoring devices. Each of the devices can comprise registers as well as a management interface (in particular, the management interface proposed in Appendix 2 of Utopia Level 2). Apart from the control unit, the management system comprises at least one management unit. The management unit generates the configuration data for the devices and/or processes the values which can be derived from the registers of the devices. In both cases, the management unit provides instructions for those devices which are to be configured or from whose registers values are to be read-out. Subsequently, the instructions and, if need be, the data are composed in the management unit for one or several devices to which the same control unit has access. Such composition occurs as a payload of an ATM cell, with the ATM cell being addressed to the respective control unit.

In a preferred embodiment the control unit has access to more than one device. If the devices are interface devices which provide access to the physical layers of an ATM network, in particular PHYs, then it makes sense if one control device has access to all interface units which are addressable by the data interface with which the control unit is connected. Based on the UTOPIA Level 2 specification, this can be up to 31 interface units.

A preferred division of the payload space of the ATM cell according to the invention consists of providing 4 bytes both for the instruction blocks and for the supplementary block as this provides the necessary and at the same time adequate capacity for the individual spaces. In this way 11 instruction blocks can be transmitted by one ATM cell.

For each of the instruction blocks in the payload space, the ATM cell according to the invention provides space for an operation code with which the command type is determined which is allocated to the respective instruction block. It is advantageous if 2 bits are allocated to the operation code. Thus apart from the instruction types "read" and "write" an instruction type "no operation" can also be used. Such an instruction type is necessary if no complete ATM cell can be filled with instructions. Furthermore, one operation code remains for future applications.

Since in addition it makes sense if an ATM cell sensibly transports instructions for several spatially adjacent devices, one space has been provided for identifying an addressed device. According to the UTOPIA Level 2 specification, up to 31 interface units can be addressed by one data interface so that up to 5 bits are required for identification. However, for the time being an identification space of 3 bits is adequate because at present, for reasons of space, no more than 8 interface units can be accommodated on one card. In order to fully take into account future extensions, 2 reserve bits can be included. By providing 3 bits for the identification space, an ATM cell according to the invention is generally suitable for communication with 8 freely selectable devices which comprise registers.

In addition, each instruction block of the ATM cell according to the invention comprises an address field for allocation of certain memory locations within the particular device. UTOPIA level 2 specifications prescribe 12 bits for the register addresses so that the entire register contents of a PHY can be addressed with an address field of 12 bits. If according to an advantageous embodiment of the ATM cell a size of 17 bits is provided for the address field, then apart from the entire register contents, a substantial memory area can also be made accessible, e.g. for addressing memory modules.

Eventually, for each of the 11 instruction blocks provided, the ATM cell according to the invention provides an area for management data. According to a preferred allocation of the spaces of the ATM cell, it is provided for each of the data fields to be one byte in size. In this way, conversion of the data into the format required for the UTOPIA parallel management interface can be simplified.

A space for identifying the cell type is reserved for the supplementary block of the ATM cell according to the invention, with 1 bit being sufficient for this. In this space, the management unit can carry out identification of an ATM cell to be transmitted, with such identification providing information whether this ATM cell is a new cell or a repetition cell. Thus for example when using a bit as a reserved space, in the case of repetition, the bit can be set to "1".

The provided sequential bit is toggled with each new cell. By contrast, in the case of a repetition cell, the sequential bit set is the same as that of the original cell. In this way the sequential bit can be used for evaluation in the case of faulty transmission being detected, as will become clear later on.

In addition a further space of for example 5 bits can be planned in as a reserve.

Many interface units, in particular many PHYs support an interrupt line to be able to signal special events such as an alarm. To meet the purpose of the interrupt lines, the software needs to poll such units to be able to react accordingly if no direct interrupt signalling is possible. The task of the software is simplified if the entire situation of the interrupt requirements of the units connected to the control unit is monitored. For this reason, the supplementary block of the ATM cell according to the invention comprises an interrupt field. This field can be updated with each new ATM cell which is transmitted. With an identification space of the addressed units of 3 bits, the interrupt field preferably comprises 8 bits so that an interrupt field in the supplementary block can be allocated to each of the 8 addressable units according to the allocation of the values in the identification area. In addition, the 5 reserve bits of the supplementary block can be used for future expansion of the interrupt field.

As there is always the possibility of errors occurring during transmission of a message, some check of corruptions should exists. For this reason an area of the supplementary block has been set aside for a checksum. After receipt of a new ATM cell, both the management unit and the control unit can thus carry out a checksum verification and discard the cell if the check indicates an incorrect transmission. The checksum is in particular formed across the entire payload.

In a preferred embodiment of the ATM cell according to the invention, prior to transmission of each cell a CRC-10 remainder is appended to each cell as the last 10 bits. In order to simplify the hardware design, the checksum is formed across all bytes of the payload except for the last 2 bytes of the supplementary block, i.e. across a total of 46 bytes. Thus 6 bits of the supplementary block (2 bytes minus 10 bit checksum) are not protected from corruption. In respect of the algorithm used it is assumed that these 6 bits are constantly set to "0", but the algorithm can be freely available.

Preferably a big-endian sequence is used for the payload area of the ATM cell according to the invention, so that the last byte of the 48 byte payload is the low-order byte of the twelfth 32-bit word of the payload. But it is also possible to select the "little endian" sequence.

The use of the first process according to the invention or control unit according to the invention or the ATM cell according to the invention, is particularly advantageous for configuring interface units which represent access to the physical layers. But it is exactly such interface units where the invention can also be used for regular acquisition of performance data and statistical data of the interface unit, by way of the control unit, by using the second process according to the invention. To do so, it is always the same instruction set which is used.

Further advantageous embodiments of the invention are described in the dependent claims.

BRIEF DESCRIPTION OF THE INVENTION

Figure 2:
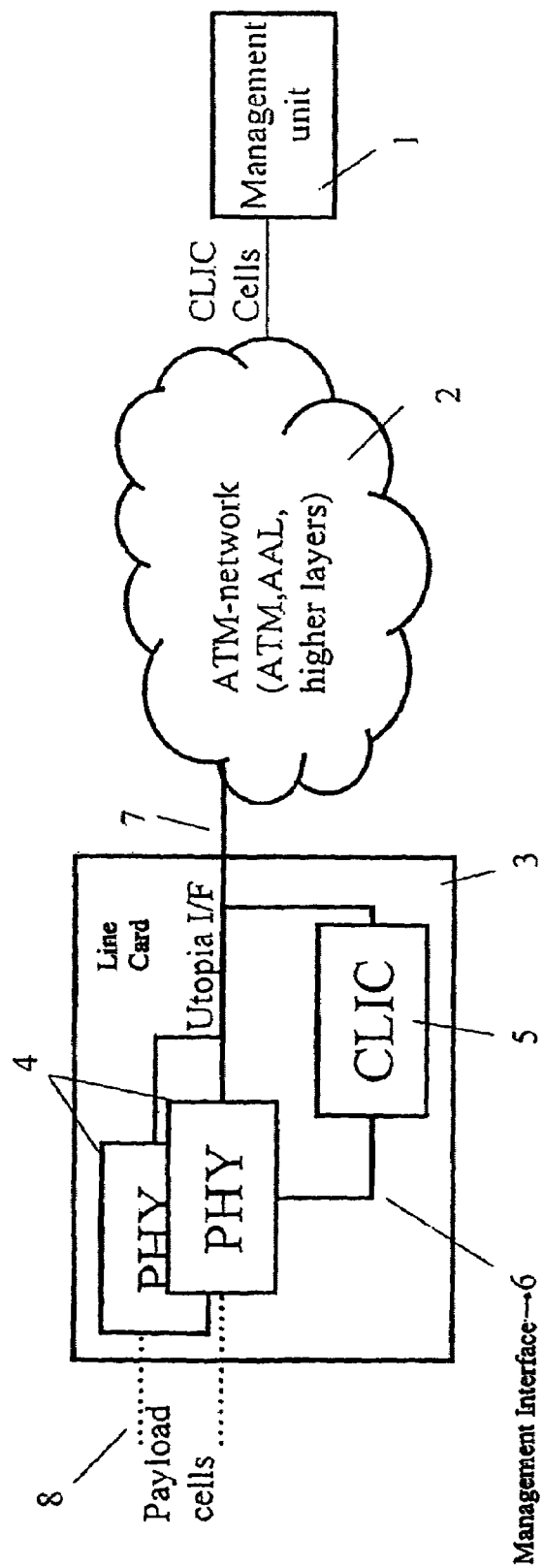

Below, the invention is described in more detail by means of embodiments referring to drawings. The following are shown:

FIG. 1: the ATM reference model;

FIG. 2: the integration of a control unit according to the invention, in an ATM network;

FIG. 3: the ATM cell format used;

FIG. 4a: the bit division, according to the invention, of the instruction blocks; and FIG. 4b: the bit division, according to the invention, of the supplementary block.

DETAILED DESCRIPTION OF THE PRESENTLY PREFERRED EMBODIMENTS

A reference to FIG. 1 has already been provided in the introduction.

FIG. 2 shows part of a typical ATM network environment. A management unit 1 as well as interface units (PHY) 4 integrated in a line card 3, of the physical layer, form part of an ATM network, respectively. The "cloud" 2 shown represents the layers ATM, AAL and "higher layers" of the network.

The management unit 1 comprises a timer.

By way of a Utopia data path interface 7, the interface units 4 have access to an ATM layer device (not shown) of the ATM network 2. Furthermore, the interface units 4 comprise a management interface 6. The path of the user data, from the interface units to the transmission medium, is indicated by dotted lines 8.

In addition to these elements, a control unit 5 (CLIC: control link circuit) has been provided which together with the interface units 4 is integrated in the line card 3. The control unit 5 is also connected to the Utopia data path interface 7 as well as with the management interface 6 of the interface units 4. There is also an intermediate memory (not shown) of the control unit 5. The management unit 1 provides management data for the interface units 4. The management data comprises instructions to be carried out, with each instruction being associated with a particular interface unit 4. From the management unit 1 to the respective control unit 4, this management information is to take the same path through the network as does the ATM-user data flow. The management information thus needs to be packed into ATM cells with addressing to the respective control unit contained in the cell header. With each ATM entity to traverse, the next path section is determined from the cell header information and the cell is forwarded along said path section via the transmission medium, until it reaches the ATM entity with the addressed control unit 5. From the point of view of the ATM, the control unit 5 behaves like an interface unit 4 which is accessible via a data path interface 7.

The control unit 5 is able to detect ATM cells addressed to it. If such a line comes in, the control unit 5 takes the data from the cell, evaluates the information received and carries out the intended instructions via the management interfaces 6.

The management unit can have access to the OAM cell stream and can thus generate CLIC cells from OAM cells, or it can generate OAM cells from the data collected via inband protocol by the PHYs, and it can send these cells to other management units via the ATM-network.

The actions requested via the instructions can in part consist of the setting of certain registers of a particular interface unit 4, or of the values of the registers of the interface unit 4 being read-out.

FIG. 3 shows the general structure of an ATM cell used for management information; hereafter it will be referred to as a CLIC cell.

Like every ATM cell, the CLIC cell too comprises a cell header of 5 bytes and a payload space of 48 bytes with the cell header among other things comprising information concerning the path (VPI/VCI).

In a CLIC cell, the payload space is divided into 11 instruction blocks of 4 bytes each as well as a supplementary block (trailer) of 4 bytes. With every instruction block, a single instruction can be transmitted.

FIG. 4a shows the structure of the 4-byte instruction blocks; said structure always remains the same. The bits of the instruction block shown are consecutively numbered from 0 to 31.

Bits 30 and 31 (OP) are reserved for the entry of an operation code. By way of possible operation codes, the following have been provided: '00' for "no operation" (NOP), '01' for "read", '10' for "write". Code '11' is kept free.

Bits 28 and 29 (R) have been kept free in reserve.

Three bits (25–27) have been provided as "device select" bits DS for identification of the interface unit 4 to which the instruction block relates. Thus up to eight interface units 4 can be configured by the control unit 5.

Furthermore, the bits 8–24 are for the register addresses of the addressed interface unit 4. With these 17 bits, all registers of an interface unit 4 can be allocated individually.

Finally, one byte (bits 0–7) has been provided for the data which provides the basis for carrying out instructions.

FIG. 4b shows the structure of the supplementary block of the CLIC cell which in the payload space adjoins the 11 instruction blocks. The supplementary block also comprises 4 bytes.

Bit 31 is used for setting a cell type identification (flag). If this bit is not set, the CLIC cell is a new cell. By contrast, if it is set, the cell is a cell sent again.

A sequential bit (bit 30) adjoins the bit for the cell type. This bit is toggled from one cell to the next, except in the case of a repetition cell. In the case of a repetition cell, the value of the last sequential bit is repeated, too.

Bits 24–29 are kept in reserve. 8 bits (16–23) for interrupts (int0–int7) follow the maximum of eight interface units 4. It makes sense if allocation of the interrupts int0–int7 corresponds with allocation of the interface units for the values 1–8, which can be set via the 3 bit DS field. If the condition of further interrupts is to be monitored, then the six reserve bits can be used for this purpose.

The bits 10–15 of the supplementary block are constantly set to '0'.

A 10 bit checksum (CRC 10) can be inserted into the last bits 0–9 of the supplementary block and thus also the CLIC cell.

According to the invention, the division of the CLIC cells provided according to FIGS. 3 and 4 not only makes it possible to exchange instructions by means of "in-band" transmission between a management unit 1 and interface units 4, but it also makes it possible to provide a reliable process if errors occur.

The process used is a request-response process. After the instructions received have been carried out, each cell sent from the management unit 1 to the control unit 5 is sent back to the management unit 1 in a modified form. In this way, the management unit 1 receives confirmation that the instructions were able to be processed by the control unit 5. In addition, the results of "read" instructions can be introduced to these response cells, said instructions having resulted from the reading of data, by the control unit 5, from the registers of the addressed interface units 4.

Both in respect of the request cell of the management unit 1 and in respect of the response cell of the control unit 5, a checksum is determined and deposited in the last 10 bits of the supplementary block, before the CLIC cell is transmitted. The polynomial $x^{10}+x^9+x^5+x^4+x+1$ is used to determine the checksum (CRC 10 remainder). This polynomial is for example also provided for in the ATM-OAM specifications (ITU-T 1.610, "Common OAM cell fields" p. 27). The checksum is formed across all bytes of the payload except for the last 2 bytes of the supplementary block, i.e. the area assumed to be set to '0' and the checksum area itself. When the CLIC cell is received in the management unit 1 or in the control unit 5, this checksum is first compared with a sum formed anew in the reception unit via the payload. Further processing will only take place if there is agreement; otherwise the cell is discarded.

The timer of the management unit 1 and the memory of the control unit 5 are provided as a safeguard in case processing of the instructions is not successful or in case of faulty transmission of a CLIC cell. The timer of the management unit 1 is always started when a CLIC cell is put out. By means of the timer it is thus possible to monitor whether a specified time limit, between transmission of the CLIC cell to receiving a response cell, has been exceeded.

This time limit can be reached if monitoring of the checksum has shown an error either by the management unit 1 or by the control unit 5, and if the CLIC cell concerned was discarded. In this case the management unit 1 resends the last CLIC cell, while maintaining the last-used value of the sequential bit. This indicates that the cell is a repetition cell, because the bit of the cell type recognition (bit 31) of the supplementary block is set to '1'. If the control unit 5 detects that the cell type bit has been set, then it compares the status of the sequential bit of the CLIC cell received with that of the preceding CLIC cell, which has been stored in the intermediate memory of the control unit 5.

If the sequential bits are different, this indicates an error detection on the receiving side and cell discarding during checksum verification in the control unit 5. Thus the CLIC cell has not yet been processed by the control unit 5. The commands of the repetition cell are carried out as if it were a new CLIC cell. Also, a response cell is regularly formed and transmitted to the management unit 1.

By contrast, if the sequential bits are identical, this indicates an error detection on the receiving end and cell discarding during checksum verification in the management unit 1. It is thus assumed that correct implementation of the instructions of the cell has already taken place, with the response cell having been lost on the way back to the management unit 1. In this case only the content of the intermediate memory in the control unit 5 is read out and sent back to the management unit 1.

Reading from the intermediate memory is necessary because the cell transmitted to the management unit 1 also contains data read out from the interface units 4, for example performance data, corresponding to a current counter state in the interface unit 4. As soon as such a counter value has been read out, usually the interface unit 4 resets the counter. In the case of renewed read-out of the register values which represent the counter status, the new counter status would be transmitted for a regular new creation of a response cell, and thus from the point of view of allocation, an incorrect value would be transmitted to the management unit 1.

Exceeding the time limit can also occur if a cell has been delayed in a data jam. In such a case the response cell may arrive late in the management unit 1, after the repetition cell has already been dispatched, so that subsequently a further response cell 5 is received by the control unit. The management unit 1 is thus able to differentiate which cells have been received. One of the two cells can then be discarded since both cells have the same content.

The invention claimed is:

1. A process for writing data into registers of at least one device comprising a management interface, comprising the steps of:

composing ATM cells via at least one management unit, said management unit addressing each ATM cell to a control unit linked to a data path interface and integrating instructions associated with particular devices together with respective information into a payload of the ATM cells;

transmitting ATM cells to the addressed control unit via a respective data path interface;

extracting operation codes associated with particular devices, associated information being contained in the payload of the ATM cells in the control unit; and setting the register values of the devices according to the information provided from the ATM cell if data is to be entered after the operation codes are extracted;

wherein for each ATM cell to be composed, the control unit maps a current interrupt state of the connected devices into interrupt bits which are provided in the payload of the ATM cells.

2. The process of claim 1, wherein the devices are ATM interface units of the physical layer by which a data path interface provides the ATM layer with access to a physical transmission medium.

3. The process of claim 1, wherein addressing of ATM cells to the control unit by the management unit occurs via a VPI/VCI address associated with the control unit, or via a reserved UTOPIA bus address of the data interface if the management unit communicates directly with the control unit via an UTOPIA data interface.

4. The process of claim 1, wherein addressing of ATM cells to the management unit by the control unit occurs via a VPI/VCI address associated with the management unit, or via a reserved UTOPIA bus address of the data interface if the management unit communicates directly with the control unit via a UTOPIA data interface.

5. The process of claim 1, wherein transmission of the ATM cells is based on a request-response protocol.

6. The process of claim 5, wherein the management unit refrains from sending additional ATM cells to a control unit until a correct response to a preceding ATM cell from said control unit is received by the management unit or until a time limit is exceeded.

7. The process of claim 1, wherein prior to any forwarding of ATM cells destined for the management unit, the control unit forms a checksum, and prior to any forwarding of ATM cells destined for a control unit, the management unit forms a checksum, across at least part of the payload of the ATM cell and integrates this sum into the ATM cell to be transmitted.

8. The process of claim 7, wherein after a specified time limit after sending a first ATM cell addressed to a control unit has lapsed and prior to receiving a response ATM cell from the control unit with a correct CRC sum, the management unit resends an identical ATM cell the ATM cell as a repetition cell, when receiving a repetition cell, the control unit checks whether, following a first ATM cell, a response ATM cell was transmitted to the management unit, and if a response ATM cell call was not transmitted to the management unit, the control unit processes the instructions contained in the cell, or if a response ATM cell was transmitted to the management unit, the control unit retransmits the response ATM cell which was previously sent once and stored separately to the management unit.

9. The process of claim 1, wherein prior to performing any instructions, the control unit checks a checksum transmitted with the received ATM cell, and performs the instructions only if no transmission error is detected, otherwise the control unit discards the ATM cell and is ready to receive new ATM cells.

10. The process of claim 9, wherein after processing each instruction of an ATM cell, the control unit places at least part of the updated content of ATM cell to be transmitted to a management unit into an intermediate memory.

11. The process of claim 9, wherein after a specified time limit after sending a first ATM cell addressed to a control unit has lapsed and prior to receiving a response ATM cell from the control unit with a correct CRC sum, the management unit resends an identical ATM cell the ATM cell as a repetition cell; when receiving a repetition cell, the control unit checks whether, following a first ATM cell, a response ATM cell was transmitted to the management unit; and if a response ATM cell call was not transmitted to the management unit the control unit processes the instructions contained in the cell; or if a response ATM cell was transmitted to the management unit the control unit retransmits the response ATM cell which was previously sent once and stored separately, to the management unit.

12. The process of claim 1, wherein the control unit autonomously and regularly reads in data from devices connected to the control unit and transmits the data, integrated into ATM cells, to the management unit.

13. The process of claim 1, wherein said integrating of instructions comprises writing data into the registers of the devices as an operation code.

14. A process for reading values from registers of a device comprising a management interface, comprising the steps of:
composing ATM cells via at least one management unit, said management unit addressing each ATM cell to a control unit linked to a data path interface, and integrating instructions associated with particular devices, together with respective information into the payload of ATM cells;
transmitting the ATM cells to the addressed control unit via the respective data path interface,
extracting the operation codes being associated with particular devices and the associated information contained in the payload of each ATM cell in the control unit; and
reading register values of the respective devices, if after the operation codes are extracted, register values are to be read out from devices;
wherein the read values are integrated into ATM cells which addressed to the management unit and transmitted to the management unit, and for each ATM cell to be composed, the control unit mas a current interrupt state of the connected devices into interrupt bits which are provided in the payload of the ATM cells.

15. The process of claim 14, wherein the devices are ATM interface units of a physical layer by which a data path interface provides access for ATM layer to a physical transmission medium.

16. The process of claim 14, wherein addressing of ATM cells to the control unit by the management unit occurs via a VPI/VCI address associated with the control unit or via a reserved UTOPIA bus address of the data interface if the management unit communicates directly with the control unit via an UTOPIA data interface.

17. The process of claim 14, wherein addressing of ATM cells to the management unit by the control unit occurs via a VPI/VCI address associated with the management unit or via a reserved UTOPIA bus address of the data interface if the management unit communicates directly with the control unit via a UTOPIA data interface.

18. The process of claim 14, wherein transmission of the ATM cells is based on a request-response protocol.

19. The process of claim 18, wherein the management unit refrains from sending additional ATM cells to a control unit until a correct response to a preceding ATM cell from said control unit is received by the management unit, or until a time limit is exceeded.

20. The process of claim 14, wherein prior to any forwarding of ATM cells destined for the management unit, the control unit forms a checksum, and prior to any forwarding of ATM cells destined for a control unit, the management unit forms a checksum, across at least part of the payload of the ATM cell and integrates this sum into the ATM cell to be transmitted.

21. The process of claim 14, wherein prior to performing any instructions, the control unit checks a checksum transmitted with the received ATM cell, and performs the instructions only if no transmission error is detected; otherwise the control unit discards the ATM cell and is ready to receive new ATM cells.

22. The process according to claim 21, wherein after each processing instructions of an ATM cell, the control unit places at least part of updated content of the ATM cell to be transmitted to a management unit into an intermediate memory.

23. The process of claim 21, wherein after a specified time limit after sending a first ATM cell addressed to a control unit has lapsed and prior to receiving a response ATM cell from the control unit with a correct CRC sum, the management unit resends an identical ATM cell the ATM cell as a repetition cell, when receiving a repetition cell, the control unit checks whether, following a first ATM cell, a response ATM cell was transmitted to the management unit, and if a response ATM cell call was not transmitted to the management unit, the control unit processes the instructions contained in the cell, or if a response ATM cell was transmitted to the management unit, the control unit retransmits the response ATM cell which was previously sent once and stored separately to the management unit.

24. The process of claim 20, wherein after a specified time limit after sending a first ATM cell addressed to a control unit has lapsed and prior to receiving a response ATM cell from the control unit with a correct CRC sum, the management unit resends an identical ATM cell, the ATM cell as a repetition cell, when receiving a repetition cell, the control unit checks whether, following a first ATM cell, a response ATM cell was transmitted to the management unit, and if a response ATM cell call was not transmitted to the management unit, the control unit processes the instructions contained in the cell, or if a response ATM cell was transmitted to the management unit, the control unit retransmits the response ATM cell which was previously sent once and stored separately to the management unit.

25. The process of claim 14, wherein the control unit autonomously and regularly reads in data from devices connected to the control unit and transmits the data, integrated into ATM cells, to the management unit.

26. The process of claim 14, wherein said integrating of instructions comprises reading data from the registers of the devices as an operation code.

27. A control unit providing access to a management interface of at least one device comprising registers as well as to a data path interface of an ATM network, said control unit being configured to receive ATM cells composed by a management unit and destined for the control unit via the data path interface, and being configured to extract individual instructions associated with a particular device from a payload of the devices and extract and perform the individual instructions associated with a respective device; wherein for each ATM cell to composed the control unit maps the current interrupt state of the connected devices into interrupt bits provided for this purpose in the payload of the ATM cell.

28. The control unit of claim 27, wherein the management interface is the management interface as proposed in Appendix 2 of Utopia Level 2 specification.

29. The control unit of claim 28, wherein the management interface is the management interface as proposed in Appendix 2 of Utopia Level 2 specification.

30. The control unit of claim 27, wherein the data path interface is the data path interface as specified in Appendix 2 of Utopia Level 2 specification.

31. The control unit of claim 27, wherein the control unit is configured to compose it is the register data read from the registers of the devices to ATM cells, address the ATM cells to a management unit via the VPI/VCI address of the management unit or address the ATM cells using a UTOPIA address reserved for inband communication, and forward the ATM cells to the data path interface.

32. The control unit of claim 31, wherein the control unit comprises an intermediate memory for storing at least part of the content of the ATM cell to be transmitted to the management unit.

33. The control unit of claim 27, wherein said extraction and performance of the individual instructions comprises at least one of writing register data into the device and reading register data from the devices.

34. The management system for an ATM network for at least one of configuring and monitoring devices comprising registers and a management interface, respectively, with the management system comprising control units according to claim 14, as well as at least one management unit configured to generate configuration data for the devices and process data available from registers of the devices, said management unit being configured to respectively generate instructions for a particular device, for joining instructions and data for one or several devices to which an identical control unit has access, as a payload of an ATM cell and for addressing the ATM cell to the respective control unit.

35. The management system of claim 34, wherein the devices comprising registers are connected to a unit of an ATM layer of the ATM network via a data path interface.

36. The management system of claim 35, wherein the devices comprising registers are ATM interface units of a physical layer via which an ATM layer of the ATM network has access to at least one transmission medium.

37. The management system of claim 34, wherein the devices comprising registers are ATM interface units of a physical layer via which an ATM layer of the ATM network has access to at least one transmission medium.

38. The management system of claim 37, wherein the control unit has access to management interfaces of up to 31 interface units.

39. A management unit for constructing al ATM cell, comprising:
a cell header of 5 bytes and a payload space of 48 bytes, said cell being configured to transmit management data between a management unit having access to an ATM network and at least one device, said device comprising registers into which data is at least one of written and read out; and
a management interface via which a control unit has access to the registers of the device, said data being destined for the control unit, said control unit also having access to a data path interface of an ATM network and being configured to receive ATM cells composed by a management unit via the data path interface, extract individual instructions associated with a particular device from a payload space of the ATM cells and extract associated information and perform instructions with respect to the particular device;
wherein the payload space of the ATM cell comprises instruction blocks in which respective bits, which are associated with particular registers integrated in the identified device, are provided for an operation code which identifies an instruction type for identification of a device to which an instruction in an instruction block is directed, and for data required for performing the instruction, and a supplementary block, in which bits are provided for identifying the cell type as a sequential bit which is toggled with each composition of a new cell which does not constitute a repetition for interrupt information and for a checksum;
wherein 11 instruction blocks and a supplementary block of 4 bytes each are used in each payload space, and 2 bits for the identification code, 3–5 bits for identification of the device, 0–2 bits in reserve for supplementing the instruction bit up to 5 bits, 17 bits for allocation of the registers, and 1 byte for data required to perform a respective instruction are provided for each of the 11 instruction blocks; and
wherein 1 bit for identification of the cell type, 1 bit as a sequential bit, 5 additional reserve bits, 1 byte for interrupt information, and 10 bits for the checksum, formed by a cyclic redundancy check (CRC), are each provided for the supplementary block.

40. The management unit of claim 39, wherein a "big endian order" is used for the ATM cell.

41. The management unit of claim 39, wherein the ATM cell configures ATM interface units of a physical layer.

42. The management unit claim 39 wherein the ATM cell reads out data which is available in ATM interface units of a physical layer.

43. The management unit of claim 39, wherein said extraction of individual instructions associated with the particular device comprises at least one of writing register data into the devices or reading register data from the devices.

44. The management unit of claim 39, wherein the cell type is new cell or a retransmitted cell.

45. A method for constructing an ATM cell comprising a cell header of 5 bytes and a payload space of 48 bytes, said ATM cell being configured to transmit management data between a management unit having access to an ATM network and at least one device, said device comprising registers into which data is at least one of written and read out, and a management interface via which a control unit has access to the registers of the device, said data being designated for the control unit, said control unit also having access to a data path interface of the ATM network, and being configured to receive specific ATM cells composed by the management unit via the data path interface, extract individual instructions associated with a particular device from a payload space of the ATM cells and extract associated information and perform instructions with respect to the particular device, said payload space of the ATM cells comprising instruction blocks and a supplementary block, the method comprising the steps of:
 inserting into the instruction blocks bits for an operation code which identifies an instruction type;
 inserting into the instruction block bits for identification of the device to which the instruction in the instruction block is directed;
 inserting into the instruction blocks bits which are associated with particular registers integrated in the identified device;
 inserting into the instruction blocks bits for data required for carrying out the instruction;
 inserting into the supplementary block bits for identifying the cell type;
 inserting into the supplementary block a sequential bit which is toggled with each composition of a new cell which does not constitute a repetition;
 inserting into the supplementary block bits for interrupt information; and
 inserting into the supplementary block bits for a checksum;
 wherein 11 instruction blocks and a supplementary block of 4 bytes each are used in each payload space for inserting the bits, and 2 bits for the operation code, 3–5 bits for identification of the device, 0–2 bits in reserve for supplementing the identification bits up to 5 bits, 17 bits for allocation of the registers, and 1 byte for the data required to perform a respective instruction are each inserted into the 11 instruction blocks, and
 wherein 1 bit for identification of the cell type, 1 bit as a sequential bit, 5 bits additionally as a reserve, 1 byte for the interrupt information, and 10 bits for the checksum, formed by a cyclic redundancy check (CRC), are each inserted into the supplementary block.

46. The method claim 45, wherein a "big endian order" is used for the ATM cells.

47. The method of claim 45, wherein said extraction of individual instructions associated with the particular device comprises at least one of writing register data into the devices or reading register data from the devices.

48. A management unit for constructing an ATM cell, comprising:
 a cell header of 5 bytes and a payload space of 48 bytes, said cell being configured to transmit management data between said management unit with access to an ATM network and at least one device, said data being destined for the control unit, said device comprising registers into which data is at least one of written and read out; and
 a management interface via which a control unit has access to the registers of the device, said control unit also having access to a data path interface of an ATM network, and being configured to receive specific ATM cells composed by a management unit via the data path interface, and extract particular information associated with a particular device from a payload space of the ATM cells, said payload space of the ATM cells comprising instruction blocks and a supplementary block;
 wherein the management unit comprises means for inserting into the instruction blocks bits for an operation code which identifies an instruction type, inserting into the instruction blocks bits for identification of the device to which the instruction in the instruction block is directed, inserting into the instruction blocks bits which are associated with particular registers integrated in the identified device, inserting into the instruction blocks bits for data required for performing the instruction, inserting into the supplementary block bits for identifying the cell type inserting into the supplementary block a sequential bit which is toggled with each composition of a new cell which does not constitute a repetition, inserting into the supplementary block bits for interrupt information; and inserting into the supplementary block bits for a checksum;
 wherein said means are arranged to insert 2 bits for the operation code, 3–5 bits for identification of the device, 0–2 bits in reserve for supplementing the instruction bit up to 5 bits, 17 bits for allocation of the registers, 1 byte for data required to perform a respective instruction into the 11 instruction blocks; and
 wherein said means are arranged to insert 1 bit for identification of the cell type, 1 bit as a sequential bit, 5 additional reserve bits, 1 byte for the interrupt information, and 10 bits for the checksum, formed by a cyclic redundancy check (CRC), into the supplementary block.

49. The Management unit of claim 48, wherein the means are use a "big endian order".

50. The management unit of claim 48, wherein said extraction of individual instructions associated with the particular device comprises at least one of writing register data into the devices or reading register data from the devices.

51. The management unit of claim 48, wherein the cell type is new cell or a retransmitted cell.

* * * * *